United States Patent [19]

Serrander

[11] Patent Number: 4,725,118
[45] Date of Patent: Feb. 16, 1988

[54] DEVICE FOR POSITIONING THE END OF AN OPTICAL FIBRE IN A SLEEVE

[75] Inventor: Hans R. Serrander, Stockholm, Sweden

[73] Assignee: Telefonaktiebolaget LM Ericsson, Stockholm, Sweden

[21] Appl. No.: 692,045
[22] PCT Filed: May 25, 1984
[86] PCT No.: PCT/SE84/00200
§ 371 Date: Jan. 16, 1985
§ 102(e) Date: Jan. 16, 1985
[87] PCT Pub. No.: WO85/00061
PCT Pub. Date: Jan. 3, 1985

[30] Foreign Application Priority Data

Jun. 14, 1983 [SE] Sweden ................................ 8302980

[51] Int. Cl.⁴ .................................................. G02B 6/36
[52] U.S. Cl. ................................ 350/96.20; 350/96.21
[58] Field of Search ............... 350/96.20, 96.21, 96.22

[56] References Cited

U.S. PATENT DOCUMENTS 4,380,366  4/1983  Franken et al. ............... 350/96.21
4,391,487  7/1983  Melman et al. ................ 350/96.20
4,668,045  5/1987  Melman et al. ................ 350/96.20

FOREIGN PATENT DOCUMENTS 53-70835  6/1978  Japan .............................. 350/96.20

Primary Examiner—William L. Sikes
Assistant Examiner—Brian M. Healy
Attorney, Agent, or Firm—Roberts, Speicens & Cohen

[57] ABSTRACT

A device for positioning the end of an optical fibre (1) in a sleeve (10) includes at least three mutually parallel rods (2, 3, 4, 5) forming a passage between themselves for accommodating the fibre end, one end of the rods being intended for insertion into the sleeve (10). Each rod has two flat surfaces intersecting each other at a long edge, one flat surface of each rod lying against a flat surface of an adjacent rod such that the long edges of the rods extend parallel to, and are distributed around the symmetrical axis of the passage. The rods are mutually displaceable in relation to the symmetrical axis, while the engaging surfaces slide on each other for changing the size of the passage to suit different fibre diameters. The ends of the rods intended for insertion in the sleeve have a third flat surface (11, 12, 13, 14) forming equal angles with the two flat surfaces of the respective rod which is intended to engage against a complemental flat surface in the sleeve (10).

12 Claims, 3 Drawing Figures

DEVICE FOR POSITIONING THE END OF AN OPTICAL FIBRE IN A SLEEVE

FIELD OF THE INVENTION

The present invention relates to a device for positioning the end of an optical fibre in a sleeve and includes at least three mutually parallel rods, forming between themselves a passage for receiving the fibre end, one end of the rods being intended for accommodation in the sleeve.

BACKGROUND

Such devices, which can be used for contactors, connection means or auxiliary measuring means for optical fibres, are known from DE-B2-2757216 and EP-B1-015046, for example. These known devices are complicated in their construction, however, and are therefore expensive to manufacture.

SUMMARY OF THE INVENTION

The object of the present invention is to provide an apparatus of the kind described above that is easy and inexpensive to manufacture, and that gives a distinct positioning of an optical fibre, irrespective of the fibre diameter.

This is achieved by the device in accordance with the invention in which each rod has first and second flat surfaces intersecting one another along a longitudinal edge, one flat surface of each rod bearing against a flat surface of an adjacent rod such that the longitudinal edges of the rods extend parallel to and are distributed around the axis of symmetry of the passage. The flat surfaces of rods are slidable on one another to vary the size of the passage to accommodate fibres of different diameter. The rods each include a portion inserted into the sleeve which has a third surface forming equal angles with the first and second surfaces of the rod. The sleeve has flat surfaces bearing respectively against corresponding third surfaces of the rods.

BRIEF DESCRIPTION OF THE FIGURES OF THE DRAWING

The invention will now be described in detail below with reference to the accompanying drawing, in which.

DETAILED DESCRIPTION OF PREFERRED EMBODIMENTS

Figure 1:
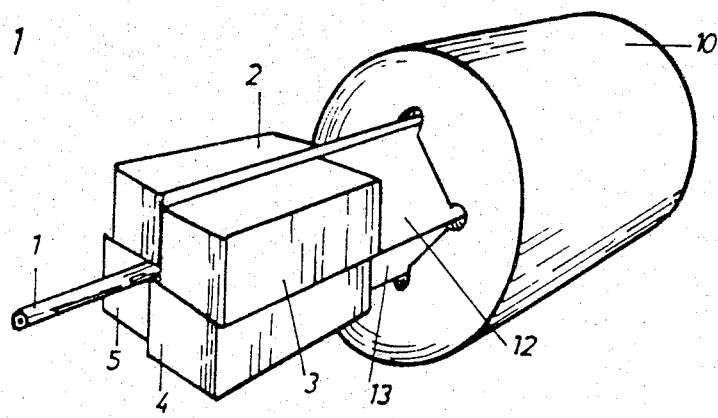
FIG. 1 is a perspective view of an embodiment of a device in accordance with the invention.

FIG. 1 illustrates an embodiment of a device in accordance with the invention for positioning the end of an optical fibre 1 in a sleeve 10. The illustrated embodiment includes four mutually parallel rods 2, 3, 4 and 5, between themselves forming a passage accommodating the end of the fibre 1, the sleeve 10 accommodating one end of each rod.

Figure 2:
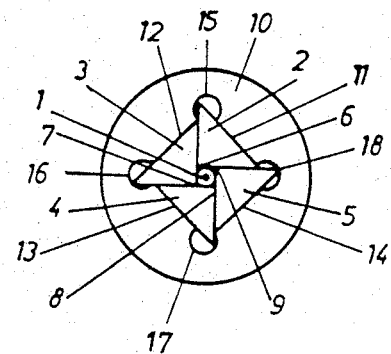
FIG. 2 is an end view of the device in FIG. 1.

Each of the rods 2-5 has two flat surfaces, and in the illustrated embodiment these surfaces meet one another at right-angles along a long edge 6, 7, 8, and 9, as in FIG. 2. In accordance with the invention, one of the two flat surfaces on the respective rod engages against one of the two flat surfaces on a juxtaposed rod such that the long edges 6-9 of the respective rods 2-5 extend parallel to, and distributed around the axis of symmetry of the passage for the fibre 1 formed between the rods.

The rods 2-5 are mutually, displaceable in relation to this axis of symmetry, while gliding against their mutually engaging surfaces for the purpose of changing the size of the passage to enable the accommodation of fibres having different diameters.

The fibre and its surrounding rods may be glued to each other to ensure fixation of the rods and the fibre accommodated between them.

To enable the accommodation of the rods in a single sleeve 10 for different diameters of the fibre 1, the ends of the rods 2-5 intended for insertion in the sleeve 10 are each formed with a third flat surface 11, 12, 13 and 14, which is preferably parallel to the longitudinal edge of the respective rod, in the present case forming an angle 45° relative to both flat surfaces intersecting each other at right-angles, each of which engages against its complementary surface on adjacent rods. The other ends of the rods are formed with a quadratic section in the illustrated embodiment, but may of course be formed in any other suitable way.

In the embodiment illustrated in FIGS. 1 and 2, the ends of the rods 2-5 inserted in the sleeve 10 are formed as identical isosceles right-angle triangles. In this embodiment, the interior walls of the sleeve 10 enclose a cavity of substantially quadratic cross-section. To enable the accommodation in the sleeve of mutually displaced rods for placing fibres of different diameters between the rods, the sleeve is provided with longitudinal recesses 15, 16, 17 and 18 along the intersection lines between the mutually perpendicular interior walls. The size of the recesses 15-18 depends on the diameter of the fibre 1 that is to be placed between the rods 2-5.

Figure 3:
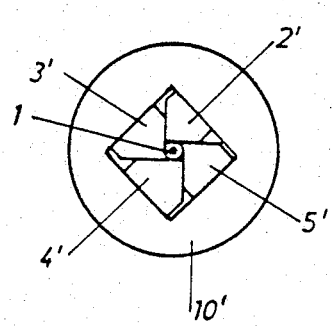
FIG. 3 is an end view of a second embodiment of the device in accordance with the invention.

An alternative embodiment of the sleeve and the rod ends inserted in it is illustrated in FIG. 3. Here, the sleeve denoted by 10 has a cavity of purely quadratic cross-section for accommodating the rod ends. These, rod ends denoted 2', 3', 4' and 5', are chamfered at their sharp corners in a manner illustrated in FIG. 3, to enable their reception in the sleeve 10' when mutually displaced, thus enabling fibres of different diameters to be placed between the rods.

The rod ends inserted in the sleeve naturally do not need to be formed identically alike, but the advantage in doing this is that the set of rods may be inserted in the sleeve with optional rotational orientation.

A similar set of rods may be inserted in the other end of the sleeve 10 illustrated in FIG. 1, to obtain contact between the fibre 1 and the not illustrated fibre in the other set of rods.

The invention is naturally not confined to the use of four rods, it being possible to use three, five or more. In all cases, however, the sum of the angles between both longitudinally intersecting surfaces of the respective rods must attain 360°. In the case with three rods, this angle will thus be 120°, while the angle between the third flat surface of the respective rod and each of its other two flat surfaces will be 60°.

What is claimed is:

1. A positioning device for a cylindrical optical fibre comprising a sleeve and at least three parallel rods engaged in said sleeve and defining a passageway with a longitudinal axis of symmetry for accomodating a cylindrical optical fibre in determined position, said rods each having first and second flat surfaces intersecting one another along a longitudinal edge, one flat surface of each rod bearing against a flat surface of an adjacent rod such that the longitudinal edges of the rods extend parallel to and are distributed around said axis of symmetry of the passageway, said flat surfaces of said rods being slidable on one another to vary the size of said passageway for accomodating fibres of different diameter, said rods each including a portion inserted into said sleeve having a third flat surface forming equal angles with said first and second surfaces thereof, said sleeve having flat surfaces bearing respectively against corresponding third flat surfaces of said rods, said third flat surfaces of said rods being slidable on said flat surfaces of said sleeve to permit sliding of said first and second flat surfaces of said rods on one another to vary the size of said passageway.

2. A positioning device as claimed in claim 1 wherein said portion of each rod inserted into said sleeve has a polygonal cross-section.

3. A positioning device as claimed in claim 2 wherein said flat surfaces in said sleeve form a cavity of polygonal cross-section.

4. A positioning device as claimed in claim 3 wherein said sleeve is provided with longitudinal recesses at each of the corners of said cavity formed by said flat surfaces in the sleeves.

5. A positioning device as claimed in claim 3 wherein said portions of said rods which are inserted into said sleeve are each chamfered at the intersection of said third surface with the first and second surfaces of said rod.

6. A positioning device as claimed in claim 3 wherein said portions of said rods which are inserted into said sleeve are triangular in cross-section.

7. A positioning device as claimed in claim 6 wherein said opening in said sleeve is of quadratic cross-section.

8. A positioning device as claimed in claim 6 wherein said rods include respective further portions extending outside said sleeve which are of quadratic cross-section.

9. A positioning device as claimed in claim 1 wherein said first and second surfaces of each rod are at right angles to one another.

10. A positioning device as claimed in claim 1 wherein said third surfaces of said rods extend parallel to the respective edges of said rods.

11. A positioning device as claimed in claim 2 wherein said polygonal cross-section of each rod is an isosceles right triangle.

12. A positioning device as claimed in claim 1 wherein the sum of the angles formed between the first and second flat surfaces of the rods is equal to 360°.

* * * * *